United States Patent [19]

Powderly

[11] 4,338,714

[45] Jul. 13, 1982

[54] METHOD OF LOADING HOLLOW RIVETS ON A MANDREL

[75] Inventor: John Powderly, Birmingham, England

[73] Assignee: USM Corporation, Farmington, Conn.

[21] Appl. No.: 162,829

[22] Filed: Jun. 25, 1980

Related U.S. Application Data

[62] Division of Ser. No. 912,373, Jun. 5, 1978, abandoned.

[51] Int. Cl.³ .......... B23P 19/04

[52] U.S. Cl. .......... 29/433

[58] Field of Search .......... 29/235, 241, 433, 811, 29/813; 53/581; 206/338, 340, 341, 347, 554; 10/29

[56] References Cited

U.S. PATENT DOCUMENTS

| | | | |
|---|---|---|---|
| 1,800,459 | 4/1931 | Maclean | 29/811 X |
| 2,045,884 | 6/1936 | Sundback | 29/433 X |
| 2,479,695 | 8/1949 | Morin | 53/581 X |
| 2,930,503 | 3/1960 | Hamlin et al. | 206/338 |
| 3,211,293 | 10/1965 | Tarnoff | 206/554 X |
| 3,773,169 | 11/1973 | Zahuranec et al. | 29/241 X |

FOREIGN PATENT DOCUMENTS

| | | | |
|---|---|---|---|
| 2261976 | 12/1972 | Fed. Rep. of Germany | 206/338 |
| 1029118 | 5/1966 | United Kingdom . | |

*Primary Examiner*—Ervin M. Combs
*Attorney, Agent, or Firm*—William F. White

[57] ABSTRACT

Loading of a pull-through blind riveting mandrel is effected by arranging on an elongated sleeve a plurality of hollow rivets assembled head-to-tail, threading the mandrel along the sleeve, and transferring the rivets to the mandrel while withdrawing the sleeve. In addition to this procedure the invention contemplates provision of a package or assemblage for facilitating storage and/or transfer of the rivets of a column to a reuseable rivet-installing mandrel.

4 Claims, 5 Drawing Figures

FIG. 1
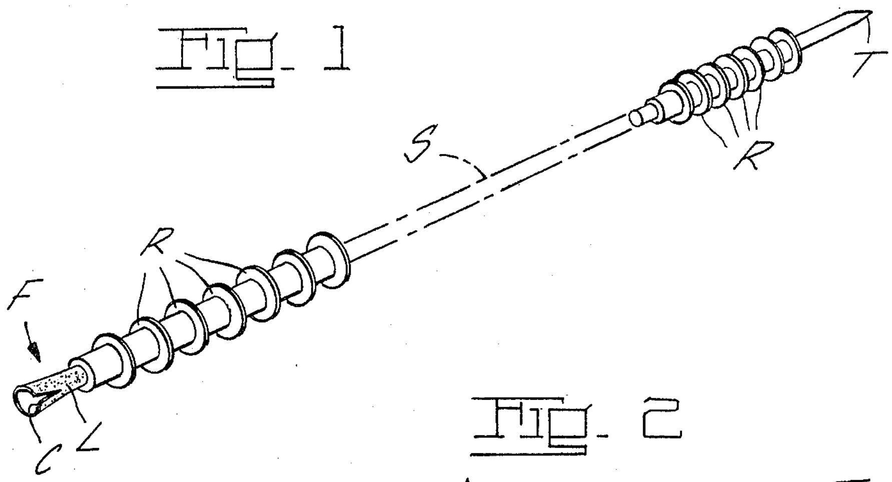
FIG. 2
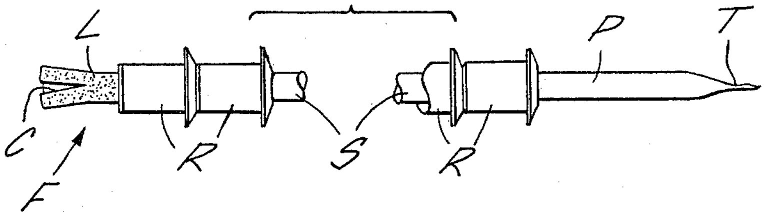
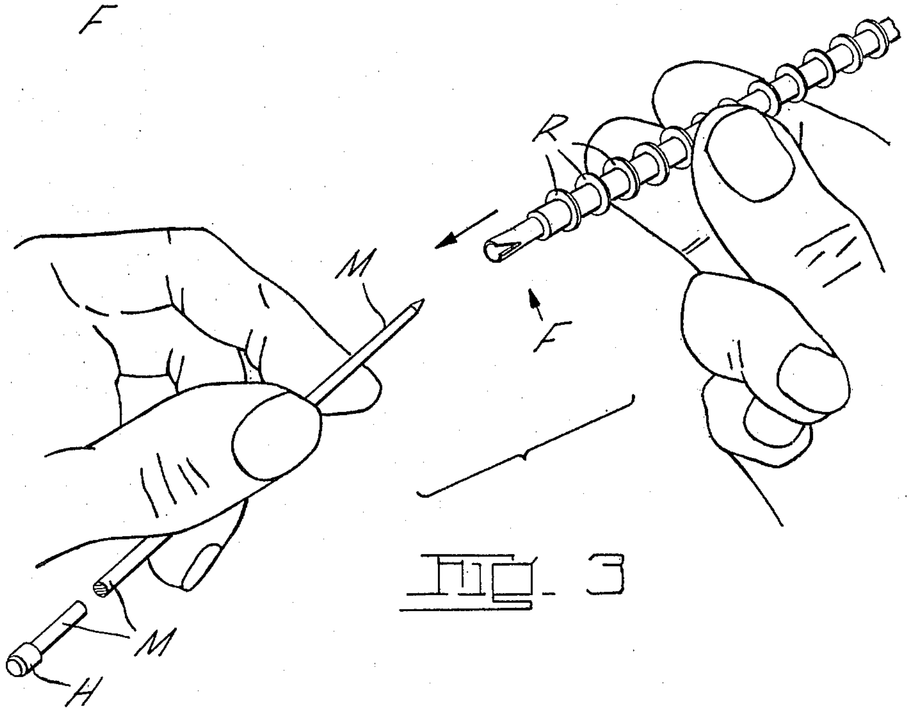
FIG. 3

METHOD OF LOADING HOLLOW RIVETS ON A MANDREL

This is a division of application Ser. No. 912,373, filed June 5, 1978, abandoned.

BACKGROUND OF THE INVENTION

This invention is concerned with improvements in or relating to the storing and handling of hollow rivets, especially when loading them onto a mandrel for use in pull-through blind riveting.

In one kind of well known blind-riveting system (that is to say, a fastening system whereby a hollow rivet can be set in aligned holes in superposed parts of a workpiece from one side only of the workpiece) a column of 30 to 60 rivets, say, depending on their length, is assembled with the rivets head-to-tail on a mandrel which, at the tail end of the foremost rivet, has a setting head. The mandrel is inserted in a blind-riveting tool which has means for gripping the mandrel at its rearward end and moving it back and forth, a split nosepiece which can abut the head of the foremost rivet and hold it against the accessible face of the workpiece while the mandrel is pulled through the rivet to set it, and means for urging the rivets forward after each setting stroke so as to project the foremost one through the nosepiece and up to the mandrel head ready for the next riveting operation. This kind of blind-riveting system will be referred to hereinafter as "pull-through blind riveting".

A mandrel for use in pull-through blind riveting has to be of high quality to ensure that it is strong enough not to break while yet it is thin enough to be accommodated in the bores of the rivets, and is therefore an expensive item which it is customary to use over and over again rather than dispense with it after setting one column of rivets. Accordingly, it is necessary to load it with a fresh column of rivets when one column has been used up.

Loading a mandrel with rivets by hand by picking them up one-by-one from a container and making sure they are all loaded the right way round is a slow and laborious procedure which is customarily avoided for example by packaging the rivets, in line head-to-tail, between strips of card or tape, slotted if need be to receive the rivet heads, in such a manner that a mandrel can readily be threaded through the aligned rivet bores and the card or tape thereafter stripped away. Such a procedure is somewhat clumsy and results in an untidy accumulation of waste packaging materials.

It has also been proposed, in United Kingdom Patent Specification 1,029,118, to thread the rivets head-to-tail on a wire rod, bent over at one end to stop the rivets falling off that end and with a friction ring to stop them falling off at the other. The specification describes how such an assemblage could, when required, be laid on one part of a two part jig, each part having a longitudinal channel for the rivet shanks and transverse grooves for their heads so that when the jig parts are closed the rivets are maintained in alignment and the wire rod can be removed and replaced by a rivet-setting mandrel. Such a procedure would avoid the accumulation of litter, but necessitate the availability of jigs for each length and diameter of rivet.

SUMMARY OF THE INVENTION

One of the various objects of the present invention is to provide an improved device for storing rivets in columns with the rivets respectively arranged head-to-tail and ready for transfer to the mandrels of pull-through blind-riveting tools.

Another of the various objects of the present invention is to provide an improved method for loading rivets onto the mandrels of pull-through blind-riveting tools.

A procedure for loading hollow rivets onto a pull-through mandrel wherein use is made of an assemblage comprising a column of rivets assembled head-to-tail on a thin-walled flexible plastics sleeve is hereinafter described in detail to illustrate the invention by way of example. In carrying out this illustrative procedure, the mandrel is threaded along the sleeve from one end, which is flared to facilitate introduction of the mandrel, until part of the mandrel at its unheaded end projects beyond the head of the rearmost rivet, whereupon the operator pinches the sleeve to grip the mandrel with one hand while he initiates the transfer of the rivets from the sleeve to the mandrel by sliding the column along with the other hand, which takes hold of the mandrel as he finally withdraws the sleeve.

The aforementioned assemblage is also itself illustrative of the invention in certain aspects, providing not only the means for facilitating the loading of the mandrel but a convenient manner for simply storing the rivets. Moreover, as hereinafter described, the illustrative assemblage can advantageously incorporate lubricant which will become transferred to the mandrel head for the riveting operations without the assemblage being too dirty for handling.

Use of the illustrative assemblage enables a mandrel to be loaded with rivets very much more conveniently than can be done with the present types of package of which we are aware and without giving rise to more waste material than the discarded sleeve, and yet avoids the necessity to have a selection of jigs ready to hand.

The invention provides, in one of its several aspects, a procedure for loading rivets onto a headed mandrel for use in pull-through blind riveting comprising the steps of providing an assemblage comprising a column of hollow rivets assembled head-to-tail on a sleeve, threading the mandrel along the sleeve, and transferring the rivets to the mandrel while withdrawing the sleeve.

The invention also provides, in another of its several aspects, an assemblage, for use in a procedure as set out in the last preceding paragraph, comprising a column of hollow rivets assembled head-to-tail on a sleeve.

Whereas the illustrative assemblage includes a flexible sleeve of plastic material such as polypropylene, for instance, other materials for the sleeve of an assemblage in accordance with the invention can be used. A flexible material is preferred to a rigid one because of the simplicity of being able to hold the mandrel by pinching it when transferring the rivets, but it is not essential. If a rigid sleeve were to be used, other means of manipulating the sleeve and mandrel for transferring the rivets could be adopted (any procedure is suitable so long as the mandrel is held in alignment with the sleeve) though the provision of one or more holes in the wall of the sleeve through which the mandrel could be firmly engaged by the operator's thumb would be advantageous. The thickness of the wall of the sleeve needs to be less than the difference between the mandrel stem and the minimum rivet bore diameters; an easy sliding fit is preferred. The preferred wall thickness depends on the diameter of rivet; for example a wall thickness of 0.008 cm is suitable for a rivet of $\frac{1}{8}$ inch (0.33 cm) external shank diameter, and 0.012 cm for a 3/16 inch (0.48 cm)

diameter rivet. Plastics materials are preferred for the sleeve because of their lightness and resistance to corrosion on storage and the range of colors that can be chosen for purposes of identification. Polypropylene and acetal resin are among the suitable relatively cheap materials.

Preferably, as is the case with the illustrative assemblage, the sleeve of an assemblage in accordance with the invention is flared at one end and closed in a manner to increase its transverse dimension at the other to prevent the rivets falling off. Flaring at the one end, whether the sleeve is split there or not, facilitates introduction of the mandrel (for which reason the rivet shanks point towards that end), while the closed end prevents the mandrel being inadvertently introduced into the sleeve from the wrong end. The invention is not, however, restricted to any particular manner of retaining the rivets on the sleeve; for example, if the mandrel of the sleeve is suitable to allow it, the sleeve may be merely bent over at each end to prevent the rivets from falling off, in which case one end portion of the sleeve could be cut off to permit introduction of the mandrel when the time comes to transfer the rivets.

Whereas the sleeve of the illustrative assemblage has an uninterrupted cylindrical wall, the sleeve of an assemblage in accordance with the invention could be otherwise, for example, if it were rigid, with an opening or openings for gripping a mandrel as aforementioned, or, whether flexible or rigid, of C-shaped cross-section. A sleeve of C-shaped cross-section, if resilient, would afford the advantage of being able to be used with a range of rivets of different minimum bore diameter, the gap between longitudinal edges of the sleeve being more closed up in rivets of smaller bore diameter than in larger ones; such a sleeve should preferably extend at least 120° round its axis when assembled in a column of rivets.

Where lubricant is desired on the mandrel head for achieving the best results in rivet setting, it may be provided in the assemblage. For cleanliness of handling, it is preferably confined to one end portion of the assemblage, that at which the mandrel is introduced. It may be coated on the inside and/or the outside of the sleeve or provided in a suitable rupturable capsule or microencapsulated.

It will be appreciated that by choosing different colored sleeves for rivets of different characteristics (material, size, length, etc.), assemblages of rivets having such characteristics can be readily recognized.

BRIEF DESCRIPTION OF THE DRAWINGS

The above and other of the various objects and several aspects of the invention will become more clear from the following description, to be read with reference to the accompanying drawings, of the illustrative assemblage and illustrative procedure aforementioned. It will be realized that this illustrative assemblage and illustrative procedure have been selected for description by way of example and not of limitation of the invention.

In the accompanying drawings:

FIG. 1 is a view in perspective of the illustrative assemblage showing a column of hollow rivets on a sleeve;

FIG. 2 is a view of the illustrative assemblage in side elevation, with a part broken away; and FIGS. 3, 4 and 5 are perspective views of successive stages in transferring the column of rivets from the sleeve of the illustrative assemblage to a mandrel.

DESCRIPTION OF PREFERRED EMBODIMENT

The illustrative assemblage comprises a column of hollow rivets R assembled head-to-tail on a sleeve S. There initially are preferably some 30 to 60 rivets on the sleeve, depending on their length. The sleeve S is split and flared at one end F (FIGS. 1–3) to prevent the rivets falling off at that end and sealed and flattened in an axial plane (to increase the transverse dimension of the sleeve in that plane) at the other end T to prevent the rivets falling off at that end by reason of gravity. The rivet shanks point towards the flared end F of the sleeve.

The sleeve S of the illustrative assemblage is preferably made of polypropylene and may have a wall thickness of 0.008 cm (the rivet shank being ⅛ inch (0.33 cm) diameter). This provides a sliding fit inside the rivets. At its flared end F the sleeve may be coated inside and out with lubricant L (FIG. 2), which may be encapsulated so that it will be clean to handle until ruptured under pressure.

The illustrative assemblage may be used for manually loading a pull-through riveting mandrel in the following manner, which is illustrative of the invention in its procedure aspects.

Taking the assemblage above described, in one hand and the mandrel M in the other, FIG. 3, the tip of the mandrel is introduced into the sleeve S through the flared end portion F. The mandrel M is pushed axially along the sleeve until its tip reaches the sealed end portion T, whereupon the operator pinches the sleeve with one hand as at P near the end portion S, thereby gripping the inserted mandrel. At this stage, the end portion F is still spaced a short distance (say five centimeters) from the head H (FIG. 3) of the mandrel. (It will be appreciated that in the foregoing description, threading the flared end of the sleeve over the mandrel and pushing it along the mandrel stem is in effect the same thing as introducing the mandrel into the sleeve and pushing it along the sleeve.) The next stage, shown in FIG. 4, in carrying out the illustrative procedure is to transfer the rivets R to the mandrel M by sliding them along the sleeve S until the foremost rivet reaches the mandrel head, during which time the mandrel remains firmly gripped by the operator at P. As the column of rivets moves up the mandrel to the head H, however, and without itnerrupting the relative movement between the rivets and the sleeve, the operator slides the sleeve off the mandrel, leaving the rivets on the mandrel (FIG. 5). The mandrel is thus loaded and ready for use. The operator may reuse or discard the sleeve S.

Figure 4:
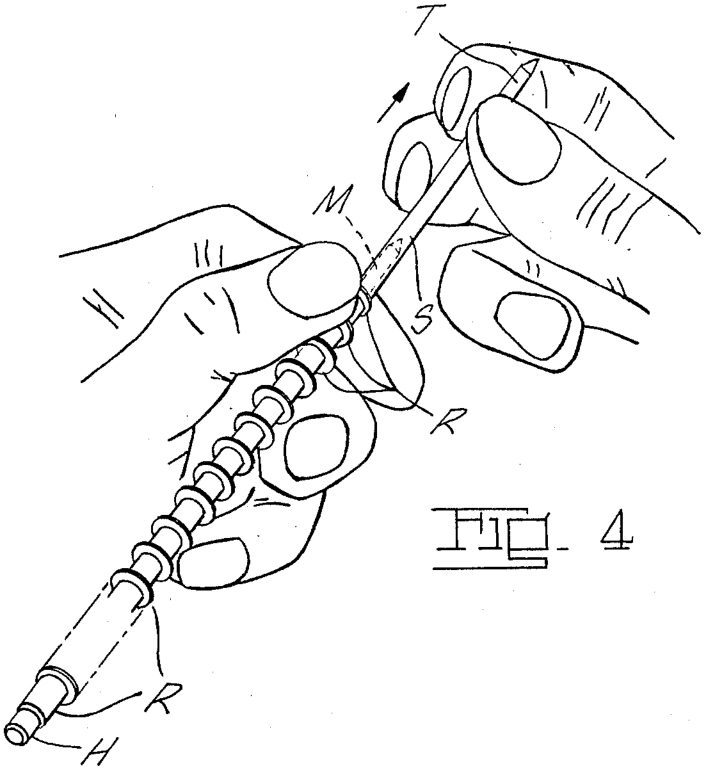
Figure 5:
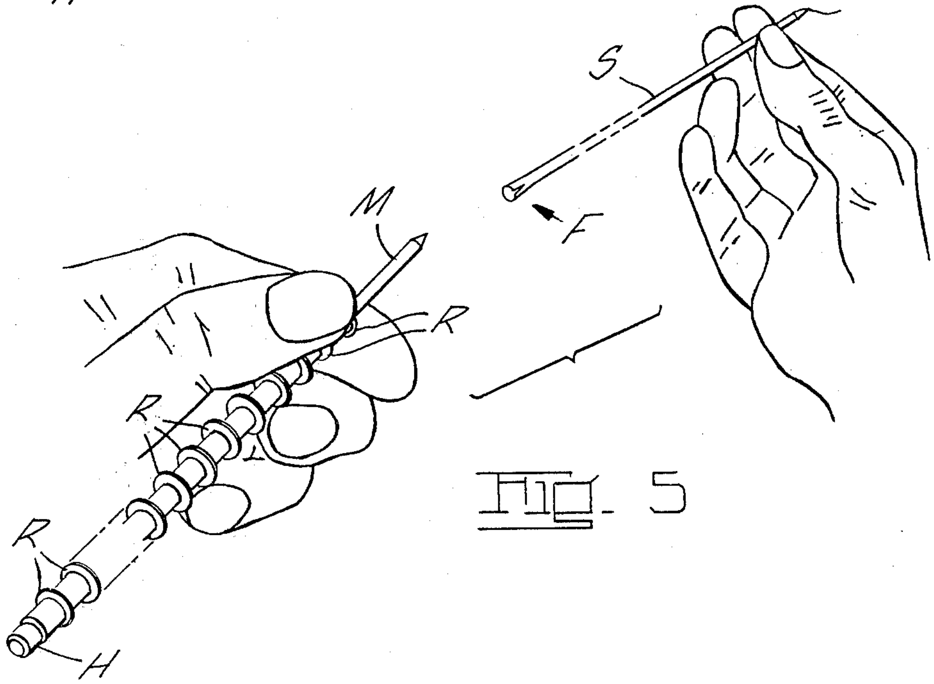

Alternatively, in carrying out the illustrative procedure, instead of holding the assemblage as shown in FIG. 4 and sliding the rivets R along the sleeve S while pinching the sleeve with his hand, the operator may prefer to raise the mandrel M to a vertical position, head H uppermost, take hold of the lowermost rivet R with one hand, and pull the sleeve S downwardly to slide it off the mandrel with the other, leaving the rivets behind.

Where lubricant L has been provided at the flared end F of the sleeve S of the illustrative assemblage, some at least of it will have been transferred to the head end portion of the mandrel M, either deposited directly from the inside of the flared portion of the sleeve or stripped from the sleeve by the leading rivets.

The sleeve S of the illustrative assemblage is of a dimension to slide easily over the mandrel M, and while flexible enough to be pinched at P for gripping the mandrel through it, if the operator wishes to, is stiff enough to be packaged in a straight condition with others in a suitable container, and to remain substantially straight when picked up at its mid-point.

Flaring of the sleeve of the illustrative assemblage as at F is a simple and convenient way of preventing the rivets accidentally falling off, yet allowing them readily to slide over that end of the sleeve when being transferred to the mandrel; such flaring may involve making one or two lengthwise slits in the tube as at C (FIG. 2). Sealing, by pinching with a heated tool, is, however, preferred at the other end so that, provided the rivets are assembled on the sleeve the right way round, they cannot be inadvertently loaded onto the mandrel the wrong way round.

Having thus described my invention, what I claim as new and desire to secure as Letters Patent of the United States is:

1. A method of loading a pull-through, blind-riveting mandrel with a column of headed hollow rivets having stem portions to be set thereby comprising:

assembling the rivets in a head-to-tail relation on an elongated tubular sleeve having an engagement means disposed at one end for retaining said rivets on said sleeve, and positioning the head of the first rivet being placed nearest the engagement means;

introducing the mandrel inside the sleeve from an end of the sleeve opposite the engagement means;

while the mandrel is inside the sleeve; and then relatively withdrawing the mandrel from the sleeve transferring the rivets onto the mandrel.

2. The method of claim 1 wherein the elongated sleeve is made of flexible plastic material having an end that is flared and lubricated and wherein said step of withdrawing the sleeve comprises:

moving each rivet over the flared and lubricated end during the transfer of the rivets onto the mandrel;

3. The method of claim 1 wherein the elongated, tubular sleeve is made of a flexible plastic material which can be pinched by finger pressure, said method further comprising the steps of:

pinching the sleeve after said step of introducing the mandrel inside the sleeve so as to hold said mandrel inside the sleeve by the pinching pressure; and transferring at least one rivet from the elongated sleeve onto said mandrel which is being held stationary within said elongated sleeve by the pinching pressure.

4. The method of claim 1 wherein the stem portion of the respective rivets are arranged nearer a setting head of the mandrel than their rivet heads, respectively.

* * * * *

UNITED STATES PATENT OFFICE
CERTIFICATE OF CORRECTION

Patent No. 4,338,714 Dated July 13, 1982

Inventor(s) John Powderly

It is certified that error appears in the above-identified patent and that said Letters Patent are hereby corrected as shown below:

Column 6 - Line 2, Delete "being placed"

Column 6 - Line 5, before "while" Add "transferring the rivets onto the mandrel"

Column 6 - Line 6, after "sleeve" Add "."

Column 6 - Line 7, Delete "transferring the rivets onto the mandrel."

Signed and Sealed this

Sixteenth Day of November 1982

[SEAL]

Attest:

GERALD J. MOSSINGHOFF

Attesting Officer

Commissioner of Patents and Trademarks